(12) United States Patent
Bayer

(10) Patent No.: US 8,271,970 B2
(45) Date of Patent: Sep. 18, 2012

(54) METHOD FOR SOFTWARE DISTRIBUTION

(75) Inventor: Stefan Bayer, Fürth/Burgfarrnbach (DE)

(73) Assignee: Siemens Aktiengesellschaft, Munich (DE)

( * ) Notice: Subject to any disclaimer, the term of this patent is extended or adjusted under 35 U.S.C. 154(b) by 1193 days.

(21) Appl. No.: 11/584,066

(22) Filed: Oct. 20, 2006

(65) Prior Publication Data

US 2007/0100907 A1 May 3, 2007

Related U.S. Application Data

(60) Provisional application No. 60/730,737, filed on Oct. 27, 2005.

(30) Foreign Application Priority Data

Oct. 27, 2005 (DE) .......................... 10 2005 051 603

(51) Int. Cl.
G06F 9/44 (2006.01)
G06F 9/445 (2006.01)
(52) U.S. Cl. ........................................ 717/172; 717/177
(58) Field of Classification Search .................. 717/172, 717/177
See application file for complete search history.

(56) References Cited

U.S. PATENT DOCUMENTS

| | | | |
|---|---|---|---|
| 5,835,911 A * | 11/1998 | Nakagawa et al. ................... | 1/1 |
| 5,909,581 A | 6/1999 | Park | |
| 6,006,034 A | 12/1999 | Heath et al. | |
| 6,199,204 B1 * | 3/2001 | Donohue ....................... | 717/178 |
| 6,718,547 B2 | 4/2004 | Takco | |
| 6,718,549 B1 | 4/2004 | Narin et al. | |
| 6,751,794 B1 * | 6/2004 | McCaleb et al. ............... | 717/168 |
| 6,854,112 B2 * | 2/2005 | Crespo et al. .................. | 717/174 |
| 7,162,538 B1 * | 1/2007 | Cordova ....................... | 709/238 |
| 7,546,595 B1 * | 6/2009 | Wickham et al. .............. | 717/168 |
| 7,584,467 B2 * | 9/2009 | Wickham et al. .............. | 717/171 |
| 2002/0129356 A1 * | 9/2002 | Hellerstein et al. ........... | 717/177 |
| 2002/0156894 A1 * | 10/2002 | Suorsa et al. .................. | 709/226 |
| 2003/0046682 A1 * | 3/2003 | Crespo et al. .................. | 717/178 |
| 2003/0066065 A1 * | 4/2003 | Larkin .......................... | 717/177 |
| 2003/0131129 A1 * | 7/2003 | Becker et al. .................. | 709/238 |
| 2004/0019889 A1 * | 1/2004 | Melchione et al. ............ | 717/177 |
| 2004/0243995 A1 * | 12/2004 | Sheehy ......................... | 717/174 |
| 2004/0243996 A1 * | 12/2004 | Sheehy et al. ................. | 717/174 |
| 2005/0144616 A1 * | 6/2005 | Hammond et al. ............ | 717/173 |
| 2005/0278395 A1 * | 12/2005 | Sandaire ....................... | 707/203 |
| 2007/0043831 A1 * | 2/2007 | Kessler et al. ................. | 709/219 |
| 2007/0100907 A1 * | 5/2007 | Bayer ........................... | 707/203 |
| 2007/0169073 A1 * | 7/2007 | O'Neill et al. ................ | 717/168 |
| 2008/0127172 A1 * | 5/2008 | Dawson et al. ................ | 717/174 |

OTHER PUBLICATIONS

U.S. Appl. No. 11/141,618, filed May 31, 2005.

* cited by examiner

Primary Examiner — Don Wong
Assistant Examiner — Marina Lee
(74) Attorney, Agent, or Firm — Lempia Summerfield Katz LLC

(57) ABSTRACT

A method for software distribution is provided. The method is for software distribution from a central provider server of a software provider to a customer system with at least one technical device, on which at least one application program managed by the software provider is installed. The method includes storing information about a customer version of the application program used by the customer system and a current version in a database on the central provider server, and making a program packet, which corresponds to the current version of the application program, available to the customer system by way of a data line when the present customer version does not correspond to the current version.

12 Claims, 1 Drawing Sheet

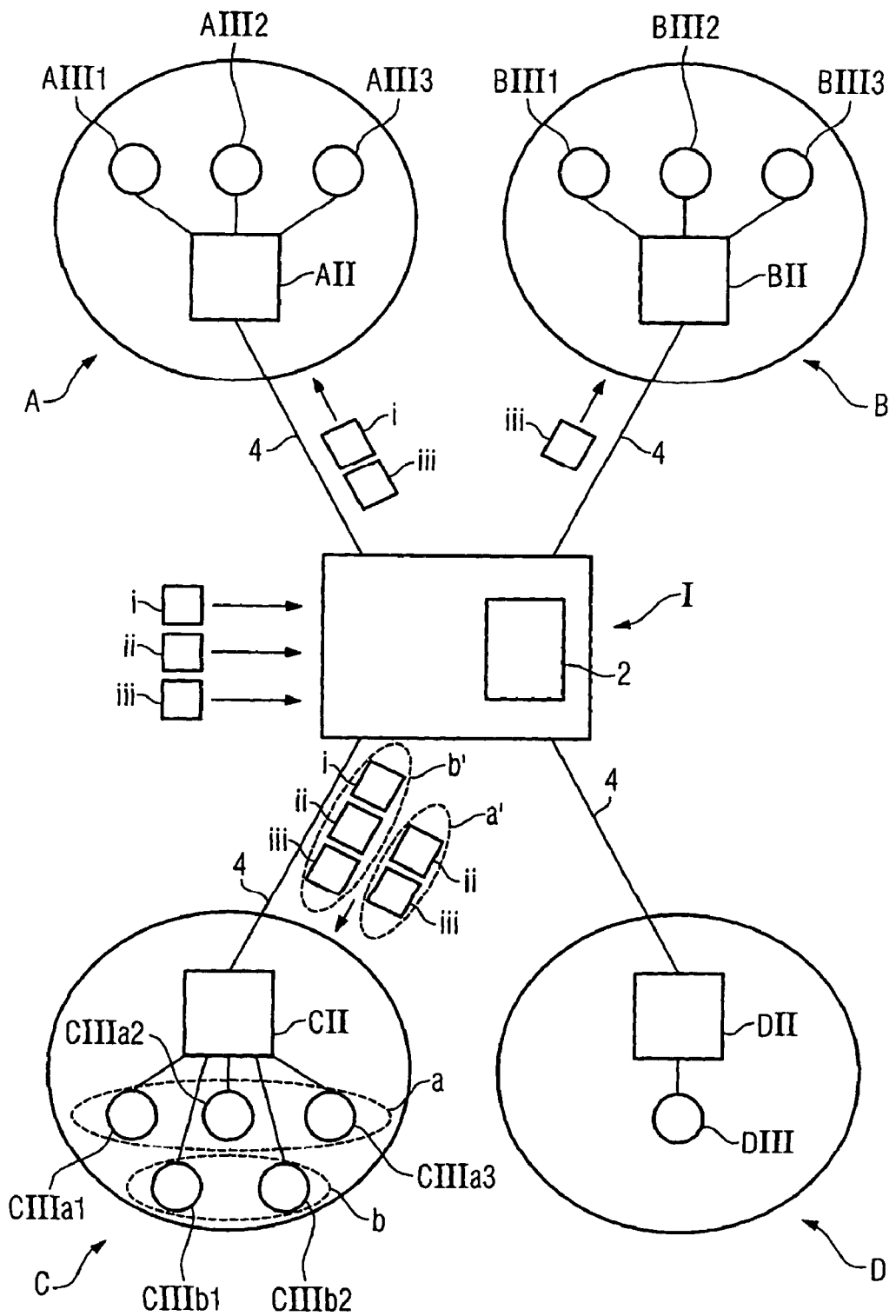

US 8,271,970 B2

METHOD FOR SOFTWARE DISTRIBUTION

This patent document claims the benefit of U.S. Provisional Application No. 60/730,737, filed on Oct. 27, 2005, which is hereby incorporated by reference. This patent document also claims the benefit of DE 10 2005 051 603.3, filed on Oct. 27, 2005, which is hereby incorporated by reference.

BACKGROUND

1. Field

The present embodiments relate to a method for software distribution.

2. Related Art

U.S. Pat. No. 6,718,547 B2 discloses a method for the management of a customer system, wherein a number of medical devices are connected together by a network. The individual medical devices have computation units. Application programs run on the computation units. The application programs are managed by the software manufacturer or provider. The software provider uses a central provider server for management of the application programs. Software packets of the current versions of the individual application programs are stored on the central provider server. In order to keep the individual medical devices up to date with the current software version, provision is made for the respective medical device, every time it is switched on or started up. A connection is established by way of the internet to the central provider server, and whether the software version currently installed on the medical device corresponds to the most current version stored on the central provider server is compared. If necessary, the most current version is downloaded.

U.S. Pat. No. 5,909,581, U.S. Pat. No. 6,718,549 B1 and U.S. Pat. No. 6,006,034 disclose methods, wherein the individual terminals (clients) set up a connection to a central server, in order to check the current software version and if necessary to download it.

In the case of complex specialist technical devices, such as in the case of medical diagnosis or treatment facilities with associated data evaluation, intensive, customer-specific management of the devices and their programming configuration is generally desirable and necessary. Software management and updating generally requires a significant time outlay on the part of the software provider. The software provider is generally also the manufacturer of the technical devices. It is often not desirable for individual medical devices to connect to the internet automatically.

The management and updating outlay is high, for example, when managing a plurality of customer systems with global distribution, each in turn comprising a plurality of different technical devices.

SUMMARY

The present embodiments may obviate one or more of the limitations of the related art. For example, in one embodiment, a method for software distribution allows efficient management of customer systems, such as medical customer networks.

In one embodiment, a method for software distribution from a central provider server of a software provider to a customer system with at least one device, on which at least one application program managed by the software provider is installed, includes storing information about the customer version of the application program used by the customer system and the current version in a database on the central provider server, and making a program packet, which corresponds to the current version of the application program, available to the customer system by way of a data line when the present customer version does not correspond to the current version.

In one embodiment, information about the respective customer systems is stored in a database on a central provider server of the software manufacturer (e.g., device manufacturer). The customer systems' information includes, for example, the nature of the application program used respectively with the customer system and the customer version of it currently installed at the customer. In another embodiment, the customer systems' information also includes, for example, more detailed data about the technical devices used, as well as the hardware and/or software configuration.

In one embodiment, information is also stored on the central provider server about the currently valid version of the respective application programs in each instance. In this embodiment, the central provider server now checks automatically, based on the information available to it, whether the respective customer version corresponds to the current version and, if necessary, makes a program packet corresponding to the current version of the respective application program automatically available as an update to the customer system by way of a data line. This is done, for example, by sending a message to the customer that an update is available for a specific device and for a specific application program.

In one embodiment, all relevant data is available centrally on the provider server of the software provider. In this embodiment, specific bundles of the required program packets are available in a specific and individual manner for each customer system. Each individual technical device and application software running on the customer system is known, which allows customer-specific and individual management. Whether and which program packet is required is automatically selected by way of the provider server for the respective individual device, which prevents the provider's service personnel from having to carry out time-intensive checks. In one exemplary embodiment, the customer is automatically informed that a respective update is available, which allows a customer-specific, efficient software update and distribution. In one embodiment, completely new application programs are provided in the manner described above, if necessary or desirable. For example, a new software module can be added to an already existing technical device, which allows a specific evaluation.

In one embodiment, an expedient development provision is made for a device address of the technical device, which is to be stored in the database, and for the respective program packet, which is to be made available to the customer system with details of the device address. In this embodiment, the individual program packets are addressed in a unique manner for customers using a simple process. Complex customer systems, which comprise a plurality of different technical devices, require a simplified process for reliable assignment of the respective program packets. A device address refers to a unique IP address. In one embodiment, it is possible to specify the devices by way of their respective device names, if unique IP addresses do not exist or are not known. In another embodiment, customer-specific designations are stored in the database of the provider server and are notified to the customer, for example, with the respective program packet.

In one embodiment, a number of customer systems are managed by the central provider server. The necessary information for each customer system is stored in the database. The customer systems are, for example, configured as closed, local networks. In principle, the technical devices can be networked together in such a closed customer network, even if the technical devices are distributed over a number of sites.

In one embodiment, the respective program packet is transmitted automatically to the customer system. The respective program packet is stored directly in the customer network by the central provider server. In this embodiment, a separate method step is not necessary for the customer to download the program packet from the central provider server. At the same time as the program packet is transferred, information that the current version has been made available to the customer is indicated in the database of the central provider server.

In one embodiment, transfer software is installed on the provider server. The transfer software, for example, automatically transfers the program packet and, if necessary, sets up a connection to the customer system automatically. The provider server includes the necessary information, for example, the IP address of a customer server and details of where the individual updates are to be stored on said server. In another embodiment, a corresponding program is installed on the customer side, which identifies the arrival of the program packets and outputs a corresponding message.

In another embodiment, the respective program packet is installed from the central provider server directly from the technical device. In this embodiment, the customer system automatically updates to the most current version respectively, without any special measures being required on the part of the customer.

Alternatively, in one embodiment, the respective program packet is made available to a central customer server and is installed in a decentralized manner from the central customer server. The program packet is stored on the customer server, for example, in a corresponding library. Distribution on the customer side takes place, for example, automatically or manually with the aid of an engineer and/or with the aid of specialist installation programs. The specialist installation programs are installed on the customer server. In one embodiment, when necessary, the specialist installation programs are installed on the customer server and also on the individual technical devices (clients).

In one embodiment, complex customer systems include a plurality of different technical devices, which significantly reduces the management outlay by way of the central provider server. The plurality of different technical devices creates the possibility of central intervention frequently required on the customer side during distribution.

In one embodiment, at least three different hierarchical levels are provided. The three hierarchical levels are, for example, the central provider server on the first level, which can be made up of a number of individual devices. The second level is a plurality of different central customer servers. The customer servers are made of a number of devices respectively for one customer. The third level is the individual technical devices (clients), on which one or more application programs are respectively installed. In one embodiment, the individual program packets are provided with the respective terminal address. In this embodiment, for example, decentralized distribution is possible in a very simple and efficient manner for the customer too.

In one embodiment, for example, for large customer systems, the same application program is frequently used for a number of devices of the same type. When the application programs are installed locally in a direct manner on the technical devices, the same program packet must be installed on different devices. For example, a respective identical program packet is made available for every individual device for such systems. In one embodiment, the respective program packet is given additional information about the devices on which it is to be installed. The respective program includes the IP addresses of a number of devices, for example, as additional information.

In one embodiment, a number of technical devices of a customer system are combined into different groups. In another embodiment, group-specific program packet bundles are provided by the provider server. A number of program packets are combined into one such program packet bundle. In one embodiment, the customer is provided with department or division-specific bundles of program packets, for example, according to their organizational structure.

In one embodiment, different access rights are granted for the program packet bundles. For example, different access rights are granted in a central manner by the provider server. In this embodiment, only authorized persons are given access to the respective program packet bundles, for example, to install the program packet bundles from the customer server onto the individual technical devices of a specific department.

In one embodiment, a confirmation of successful installation of a respective program packet is sent to the central provider server either directly from the respective technical device or indirectly by way of the customer server. The managed database is updated. In this embodiment, information, in addition to the information that a corresponding update has been made available, is stored on the central provider server. For example, the database includes information about the actual current configuration state of every individual technical device.

The present embodiments may be used for software updates and software distribution for managing medical diagnosis or treatment units as well as associated data processing units, as used, for example, in clinics or other medical facilities. Such medical devices are, for example, computed tomography units, magnetic resonance units, radiotherapy units, particle beam units in nuclear medicine, and the further components required to carry out a diagnosis or treatment with such units. Facilities for evaluating and displaying the data obtained, for example, for image evaluation, may also utilize the present embodiments.

BRIEF DESCRIPTION OF THE DRAWINGS

FIG. 1 schematically illustrates one exemplary embodiment of a diagram of a central provider server of a software provider connected to a number of customer systems.

DETAILED DESCRIPTION

As shown in FIG. 1, in one exemplary embodiment, a central provider server I, having a database 2, is connected by way of data lines 4 to a number of customer systems A, B, C and D. The data lines 4 are, for example, internet connections, fixed data lines or even individual telephone connections. In one embodiment, the individual customer systems A-D are configured as closed networks, which are not connected directly to each other. Each of the customer systems A-D therefore has its own closed, local network. The local network comprises a central customer server, for example, AII, BII, CII, DII and technical devices (clients), for example, AIII 1-3, BIII 1-3, CIII a1-a3, CIII b1-b2, DIII respectively connected thereto. The technical devices (client) are referred to more simply below with the reference characters AIII, BIII, CIII, DIII. In one embodiment, as shown in FIG. 1 a total of three hierarchical levels are provided, namely the first hierarchical level of the central provider server I, the second hierarchical level of the customer server AII-DII and the third hierarchical level of the individual technical devices AIII-DIII. The present embodiments are not limited to three hierarchical levels. The present embodiments may comprise more or less hierarchical levels depending on the need of the individual network.

In one embodiment, the customer system C has individual technical devices AIII-DIII that are combined into two groups a, b. The two groups a, b, for example, being allocated to different organizational units.

The technical devices AIII-DIII are medical devices, for example, computed tomographs, magnetic resonance devices, radiotherapy units, other suitable medical devices, computer units or PCs. One or more application programs are installed on each of the devices AIII-DIII.

In one embodiment, the individual technical devices AIII-DIII and the application programs running thereon are provided and managed by the same provider or manufacturer. In this embodiment, the software installed on the technical devices AIII-DIII is updated, for example, the most current version is provided in each instance.

In one embodiment, when an additional application program is developed by the provider, the whole program is not modified and/or replaced, just individual program packets i-iii. In one embodiment, as soon as these program packets i-iii, which are intended for different application programs, are produced, they are stored on the central provider server I. In one embodiment, the current version number of the respective application program is stored in the database 2, for example, the information is stored at the same time as the program packets i-iii are stored on the central provider server I.

In one embodiment, the database 2 contains comprehensive data about the customer systems A-D managed by the provider server I. Information about which application programs are stored at which customer and on which technical device, information about which configurations are provided and information about the customer version of the respective application program in current use in each instance is stored in the database 2. In one embodiment, an address, for example, a customer-specific designation or an IP address is also stored in the database 2 for the individual technical devices AIII-DIII. In another embodiment, the necessary contact information for setting up a connection to the individual customer servers II is also stored in the database 2. The provider server I determines which customer systems A-D are to be supplied with the corresponding program packets i-iii, for example, as soon as new program modules i-iii are available and the information about them is stored in the database 2.

In one embodiment, the provider server I collates the associated program modules i-iii for a respective customer system A-D and automatically transfers them to the respective customer system A-D, for example, when the provider server I identifies that a new program module i-iii is available for an application program used by a customer. The customer systems A-D are given only the program packets i-iii they require in each instance. The respective program packet i-iii is provided with the respective device address of the device AIII-DIII, on which the program packet i-iii is to be installed.

In one embodiment, the program packets i-iii are sent to the respective customer server AII-DII. A specialist software distribution program is installed on the provider server I. The software distribution program sets up a connection to the respective customer systems A-D and sends the program packets i-iii in a customer-specific manner to the respective customer server II. The program packets i-iii are stored automatically at the location provided in the library of the respective customer server AII-DII.

In one exemplary embodiment, the customer system C has individual technical devices that are grouped into two groups a,b. The provider server I collates two group-specific program packet bundles a', b', which are transferred to the customer system C. In one embodiment, the group-specific compilations a', b' are allocated different access rights, so that only persons with the valid access right for the respective group a', b' can install the respective program packets i-iii.

In one embodiment, installation of the individual program packets i-iii on the part of the customer systems A-D takes place in a decentralized manner from the respective customer server II. In one embodiment, this is done manually by way of a service engineer. Alternatively, the installation is done automatically by way of a suitable software distribution program, installed on the customer server AII-DII and the individual technical devices AIII-DIII.

In one embodiment, confirmation information is sent to the provider server I and stored in the database 2, for example, as soon as the program packets i-iii are installed on the respective technical device AIII-DIII. The information about the actual current version is stored in the database 2 in each instance.

In one embodiment, the configuration data of the individual technical devices AIII-DIII is stored centrally on the provider server I. The provider server I automatically compiles the required program packets i-iii in a customer-specific manner and transfers them to the respective customer system A-D as addressable program packets i-iii. In another embodiment, the addressed program packets i-iii are transferred to a central customer server AII-DII and are installed from there in a decentralized manner on the individual technical devices AIII-DIII.

In at least one embodiment, the method allows customer-friendly, time-saving and efficient software distribution of individual program packets i-iii. Alternatively, complete application programs can be distributed.

Various embodiments described herein can be used alone or in combination with one another. The forgoing detailed description has described only a few of the many possible implementations of the present invention. For this reason, this detailed description is intended by way of illustration, and not by way of limitation. It is only the following claims, including all equivalents that are intended to define the scope of this invention.

The invention claimed is:

1. A method for software distribution from a central provider server of a software provider to a customer system with a plurality of technical devices, an application program managed by the software provider being installed on at least one technical device of the plurality of technical devices, the method comprising:

storing information about a customer version of the application program used by the customer system and a current version in a database on the central provider server;

automatically transferring a program packet that corresponds to the current version of the application program from the central provider server to a customer server of the customer system by way of a data line when the central provider server determines the customer version does not correspond to the current version;

automatically transferring a confirmation of successful installation of the program packet to the central provider server when the program packet is installed on the at least one technical device of the customer system;

automatically updating the information about the customer version of the application program used by the customer system stored in the database when the confirmation of successful installation is transferred;

separating at least some technical devices of the plurality of technical devices of the customer system into a first group and a second group; and supplying group-specific program packet bundles to the customer server of the customer system by the central provider server, one of the group-specific program packet bundles including at least one program packet that is different than program packets included in another of the group-specific program packet bundles, the customer server being operatively connected to the first group and the second group, wherein different access rights are granted for the different group-specific program packet bundles, the different access rights preventing a user at a technical device of the second group from installing a first group-specific program packet bundle from the customer server.

2. The method as claimed in claim 1, comprising:

storing a device address of one technical device of the at least one technical device on the central provider server; and making the program packet available to the customer system with details of the device address.

3. The method as claimed in claim 2, comprising:

managing a plurality of customer systems by way of the central provider server, the plurality of customer systems comprising the customer system; and storing information about customer versions of application programs used, the assignment of the customer versions to respective technical devices, and addresses of the plurality of customer systems.

4. The method as claimed in claim 1, comprising:

managing a plurality of customer systems by way of the central provider server, the plurality of customer systems comprising the customer system; and storing information about customer versions of application programs used, the assignment of the customer versions to respective technical devices, and addresses of the plurality of customer systems.

5. The method as claimed in claim 4, comprising: transmitting respective program packets to the plurality of customer systems.

6. The method as claimed in claim 5, comprising: making one program packet available to a central customer server; and installing the one program packet in a decentralized manner from the central customer server.

7. The method as claimed in claim 6, comprising:

providing the one program packet for at least some technical devices of the plurality of technical devices of the customer system;

wherein the one program packet contains additional information about the technical devices, on which the one program packet is to be installed.

8. The method as claimed in claim 4, comprising: installing the respective program packets from the central provider server on the technical devices.

9. The method as claimed in claim 1, wherein the at least one technical device is a medical diagnosis unit, a treatment unit or an associated data processing unit.

10. The method as claimed in claim 1, comprising: transmitting the program packet to the customer system.

11. The method as claimed in claim 1, comprising: installing the program packet from the central provider server on the at least one technical device.

12. The method as claimed in claim 1, comprising:

making the program packet available to a central customer server, and installing the program packet in a decentralized manner from the central customer server.

* * * * *